Oct. 21, 1952     F. A. BEYER ET AL     2,614,856
INSULATED TANK VEHICLE
Filed May 4, 1950     2 SHEETS—SHEET 2
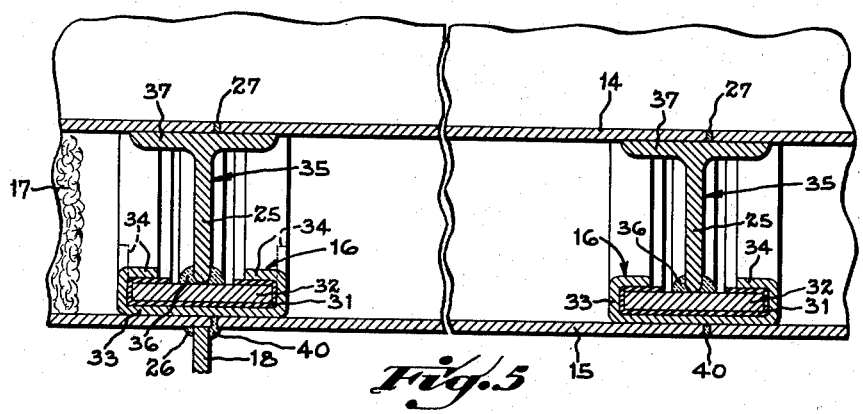
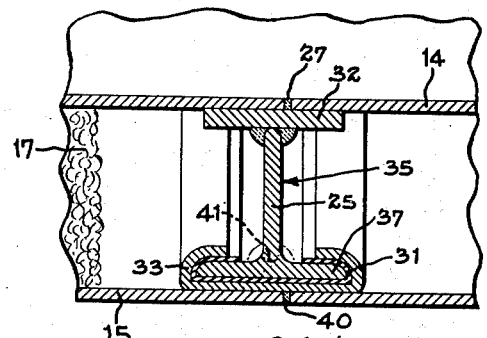
INVENTORS.
Frank A. Beyer
BY Ralph A. Bradley
Harry W. Crank
Wood, Arey, Herron & Evans
ATTORNEYS.

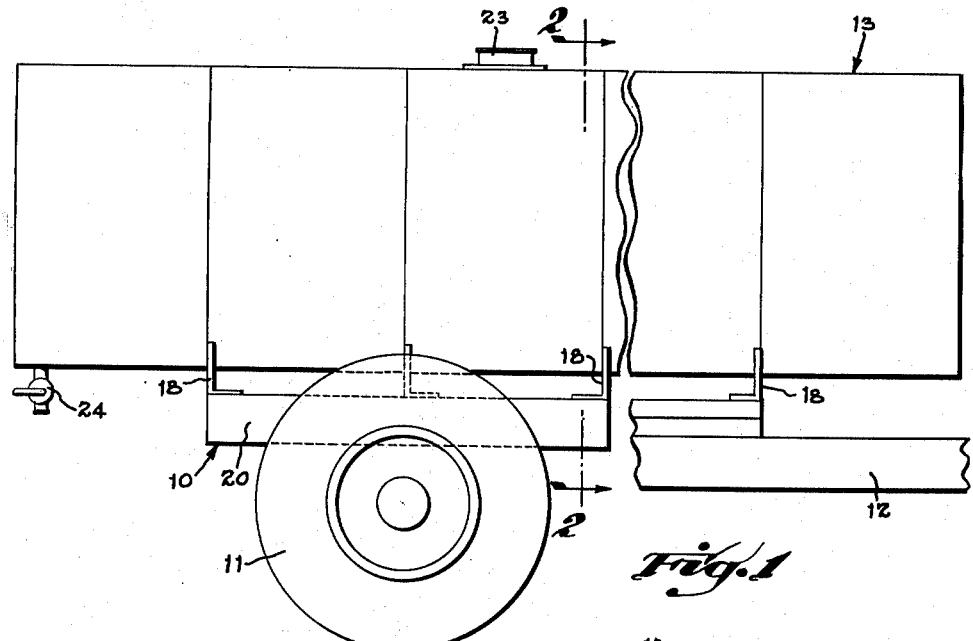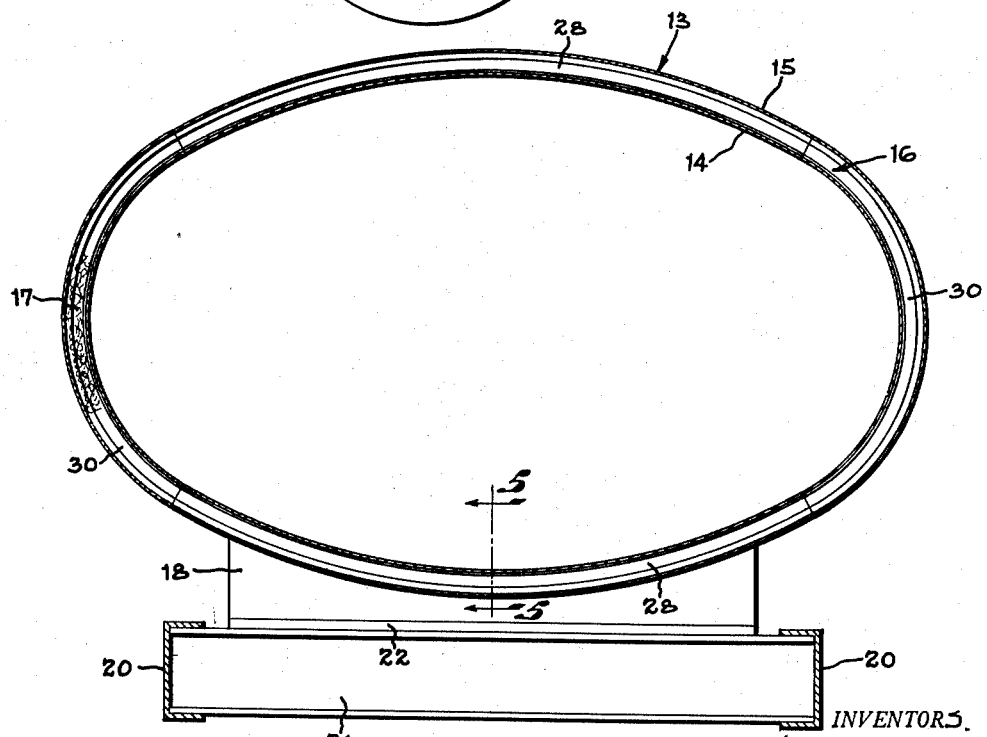

Patented Oct. 21, 1952

2,614,856

UNITED STATES PATENT OFFICE 2,614,856

INSULATED TANK VEHICLE

Frank A. Beyer, Ralph A. Bradley, and Harry W. Crank, Springfield, Mo., assignors, by mesne assignments, to Trailmobile Inc., a corporation of Delaware Application May 4, 1950, Serial No. 159,966

7 Claims. (Cl. 280—5)

This invention relates to the construction of insulated tank vehicles and in particular to an improved tank and mounting structure which provides firm mechanical support but which prevents the interchange of heat from the tank to the vehicle frame. In general, the improved tank consists of an inner shell surrounded by a spaced jacket with insulating material packed between them and with the inner shell supported directly upon the vehicle frame by means of load bearing rings which carry the load but present a barrier to the transmission of heat. The structure is intended particularly for highway transport trailers but it will be understood from the following disclosure that the improvements may be incorporated generally in the construction of insulated tanks for the temporary storage of heated or chilled liquids. As a preferred embodiment, the improved structure is disclosed in conjunction with a semi-trailer with the tank supported by road wheels at the rearward end and upon a fifth wheel at the forward end.

Insulated tanks of this class are used extensively in transporting liquids which, during transit, must be kept at a temperature which is either higher or lower than the temperature of the air, since tank vehicles are not provided with refrigerating or heating equipment. As one example, they are used in transporting milk which is chilled before loading and which must be maintained at a low temperature in transit to prevent spoilage. As another example, they are employed in hauling asphalt which is heated to an elevated temperature to reduce it to a liquid state for loading which must be maintained at or near this temperature to prevent it from stiffening before it is unloaded. The tank transports are used in hauling various other materials in heated or chilled condition, making it necessary to prevent the transfer of heat to or from the inner tank for a fairly long period while the vehicle is in transit.

The outer shell or jacket is in contact with a supporting frame, such as the vehicle chassis, and the inner shell is supported by a series of load bearing rings which support the inner shell upon the vehicle frame and space the two shells from one another. The insulation between the shells may consist of mineral wool or similar material which presents a barrier to the interchange of heat or, on the other hand, a dead air space may, in some cases, provide sufficient insulation. In either event, the load bearing rings are necessary to hold the inner and outer tank shells in spaced relationship with respect to one another and to support the inner shell since the insulating material is incapable of providing mechanical support for the inner shell which bears the weight load of the liquid contents.

It has been found that the use of ordinary metal spacers between the tank shells is unsatisfactory because a considerable amount of heat is conducted through the spacers by direct heat transfer between the inner shell and the frame upon which it is supported and this reduces very seriously the insulating efficiency of the tank unit. In other words, because of the thin metal sections of the tank shells, a considerable number of spacers is necessary to provide adequate mechanical strength; therefore, a considerable proportion of the tank area is in metallic connection with the frame causing proportionate heat losses. Non-metallic spacers which may have heat insulating qualities are not practical because they lack the necessary physical strength and are expensive and difficult to construct and install.

A principal object of the invention has been to eliminate the direct interchange of heat between the inner tank shell and its supporting frame and jacket by the provision of a tank structure having a series of load bearing rings interposed between the inner and outer shells, which rings provide a rigid mechanical support for the inner shell upon the frame but which also provide a barrier to the passage of heat from the inner shell through the rings to maintain the heat insulating efficiency of the tank. As applied to a semi-trailer, the load bearing rings consist of metal ring sectors having a heat insulating section interrupting their metal sections and which rest upon the frame to support the inner shell, the sectors being sufficiently wide in cross section to space the inner shell from the outer one and thus provide an insulating space between them. The rings are secured preferably by welding them to the respective shells to secure the shells rigidly and permanently in spaced relationship. Preferably the rings are fabricated in sectors, then welded to the assembled inner shell, the outer shell or jacket being applied in sections and welded to the outer periphery of the assembled rings. The rings are spaced longitudinally of the tank, as dictated by the length of the tank and the thickness of the metal employed in its fabrication.

As above outlined, the heat loss by conduction through the load bearing rings is eliminated in the present structure by interposing in each ring a layer of heat insulating material. In its preferred form, a sheet of asbestos or similar heat insulating material is placed in the ring section and is interlocked mechanically in a manner which does not detract from the mechanical strength of the section but which presents an effective barrier to the passage of heat.

In the preferred example disclosed, the load bearing ring consists of a structural T-iron having an insulating asbestos sheet wrapped about a metal band welded to the central web of the T-iron, the sheet being interlocked with the band by a metal sheath generally U-shaped in cross section which is clinched over upon the insulating sheet. The metal sheath preferably is channel shaped in cross section having a width dimension to receive and embrace the metal band and asbestos sheet and the side flanges of the channel are bent downwardly over the marginal edges of the insulating sheet and band to clinch the sheet under pressure. The resulting structure constitutes a base flange having a high degree of mechanical strength for attachment purposes, with the insulated sheet sandwiched therebetween to provide an efficient heat barrier. Being held under pressure, the insulating sheet is able to withstand in compression the forces imposed upon it without wear or the danger of failure since it is immobilized and completely enclosed between the band and metal sheath.

In the preferred structure, the assembled ring section represents the base flange of the T-iron to the inner shell in a position to be welded flatly to the outer surface of the shell and the metal sheath surrounding the band of the T-iron provides a flange adapted to be welded directly to the inner surface of the jacket. The T-iron base flange thus may be welded conveniently to the inner tank shell in sectors which are rolled to an arc corresponding to the cross sectional configuration of the shell and the sections making up the outer shell or jacket may then be welded to the exposed surface of the sheath. The assembled structure provides a rigid connection for spacing the shells which is capable of withstanding severe shocks and impacts encountered in highway service.

For practical purposes, the rings are fabricated in straight condition, the band, its insulating sheet and channel being clinched together, then rolled to the necessary radius conforming to the periphery of the tank. The T-irons are rolled separately and welded to the band assemblies; thus, each ring may consist of sectors which are joined end-to-end to encircle the inner tank upon assembly. These sectors are welded to the inner tank, after which the outer tank or jacket may be welded in sections to the load bearing rings as above noted with the insulating material packed between the shells as assembly progresses. Spacers of similar construction are also applied at the ends of the tanks, in this case, the spacers being of substantially the same construction but being applied in straight condition corresponding to the shape of the tank ends. After assembly, the tank is mounted upon cradles carried by the trailer frame, the cradles being aligned with the load bearing rings so that the weight load of the inner tank is transmitted directly through the load bearing rings to the cradles. In this manner, the outer shell serves primarily as an enclosure for the insulating material and is relieved of the tank stresses.

By virtue of its shape and construction, the inner tank has sufficient strength and rigidity along its longitudinal axis to support itself when spanning a pair of spaced supports; therefore, as applied to a semi-trailer, the chassis may be eliminated and the tank may be supported at opposite ends upon a running gear frame at the rear end and upon a fifth wheel frame at the forward end with its intermediate portion spanning the frames. This simplifies construction and increases the load capacity of the vehicle.

Further features and advantages of the present improvement will be more fully apparent to those skilled in the art from the following detailed description in conjunction with the drawings.

In the drawings:

Figure 1 is a general fragmentary side elevation of a tank trailer constructed in accordance with the present invention.

Figure 2 is an enlarged cross sectional view taken on line 2—2, Figure 1, detailing the tank assembly and mounting arrangement.

Figure 3 is a side view of one of the load bearing ring sectors forming the major radius of the oval ring assembly disclosed in Figure 2.

Figure 4 is a view similar to Figure 3 showing a ring sector adapted to form the minor radius of the oval load bearing ring.

Figure 5 is an enlarged sectional view taken on line 5—5, Figure 2, illustrating in detail the construction and arrangement of the load bearing rings with respect to the inner and outer tank shells.

Figure 6 is a view similar to Figure 5 showing a modified form of load bearing ring, which provides substantially the same insulating and load bearing characteristics as the form shown in Figure 5.

In the preferred embodiment disclosed in Figure 1, the improved tank is elliptical or oval in cross section with its major axis disposed horizontally relative to the trailer frame, as viewed in Figure 2. The inner tank, by virtue of its construction, is more rigid along its longitudinal axis than the usual trailer chassis; consequently, it has been found that the chassis can be omitted and the tank supported at opposite ends upon the running gear and fifth wheel. As shown in Figure 1, there is provided a running gear frame indicated at 10 which is supported upon road wheels 11, and the forward end of the tank is provided with a frame 12, having upon its undersurface a fifth wheel (not shown), adapted to mate with the fifth wheel of a tractor to establish a draft connection with the tractor in the usual manner. The tank which is indicated at 13 consists of an inner tank 14, an outer tank 15 and a series of load bearing rings 16 which encircle the tank at spaced intervals along its length. These rings support the inner shell upon the frames and maintain the inner and outer shells in spaced relationship with a suitable insulating material 17, such as mineral wool packed in the space between the shells for heat insulating purposes. The opposite ends of the tank (not shown) are constructed in a similar fashion, having inner and outer walls spaced by means of straight spacers which follow in cross section the structure of the load bearing rings shown in Figure 5 or 6.

As shown in Figures 1 and 2, the tank assembly is mounted upon the running gear frame 10 and a fifth wheel frame 12 with the intermediate portion of the tank bridging the two frames.

Cradles 18, which are formed from structural angle irons, are installed crosswise upon the respective frames with the upper edges of the cradles configurated in an arc corresponding to the curve at the bottom of the tank. The running gear frame 10 includes a pair of longitudinal side channels 20—20 joined by cross channels 21 having their ends welded or otherwise secured to the longitudinal channels. The horizontal flange 22 of each cradle rests upon the upper surface of the respective cross channels 21, being secured thereto by welding or riveting. The frame 10 is supported upon the road wheels 11 by springs (not shown) which have their ends anchored in shackles secured in the customary fashion to the underside of the longitudinal channels 20—20. The fifth wheel frame 12 preferably follows the same general construction as the running gear frame 10 having, in addition, a fifth wheel plate (not shown) secured to its undersurface adapted to rest upon the fifth wheel of the tractor. In addition, there is provided a landing gear or prop (not shown) arranged to support the forward end of the vehicle when it is uncoupled from the tractor. The tank is provided with one or more loading hatches 23 along its top and suitable valves 24 at its bottom which pass through the outer jacket and insulating material and communicate with the inner shell. The various other structural details of the vehicle have been omitted from the disclosure since they are not pertinent to the present invention.

Referring to Figure 5, the cradles 18 are located in vertical alignment with the load bearing rings 16, each ring being provided with a central load bearing web 25, as hereinafter described in detail. The cradles 18 are located in alignment with these webs, as indicated in Figure 1, so that the weight load imposed upon the inner tank by its contents is transmitted directly in compression through the web to the cradles 18, the upper edge of the cradles being welded as at 26 to the outer tank shell. As above noted, the load bearing rings include a heat insulating sheet arranged to function as a barrier to the direct transmission of heat through the rings; the structural details of the arrangement being disclosed with greater particularity hereinafter in conjunction with Figures 5 and 6.

In the present example, the inner shell 14 preferably is fabricated from sheet metal panels which are formed to the tank contour and butt welded together to provide a sealed unit. As disclosed in Figure 5, the welded joints 27 which encircle the shell preferably are located at the load bearing rings, thereby joining the tank panels securely to the rings and utilizing the rings as a backing along the edges of the joined panels. The elliptical cross section of the tank itself renders it self-supporting along its longitudinal axis as above noted; also, the load bearing rings reenforce it across its transverse axis by virtue of their stiffness, in addition to supporting the tank. The outer shell 15 serves primarily as a jacket to enclose and protect the insulating material 17, the load being carried by the rings 16 and transmitted to the cradles 18 with the outer shell virtually unstressed by the load.

In assembling the tank, the load bearing rings are fabricated in sectors which are welded to the tank at spaced intervals coinciding with the location of the support cradles 18. In the present example, the rings for the elliptical tank consist of a pair of upper and lower sectors 28 (Figure 3) having a long radius and a pair of side sectors 30 (Figure 4) having a short radius. These sectors are constructed in straight condition, then bent to the necessary radius. The structure shown in Figure 5 is preferably fabricated by wrapping the asbestos insulating sheet 31 around a straight band of steel 32 and placing a channel shaped sheath 33 over the assembled band and sheet. The portions of the channel indicated by broken lines at 34 are then folded down upon the asbestos sheet to clinch the parts permanently in pressure engagement. The assembled band, channel and sheet are then rolled into the shapes shown in Figures 3 and 4 for assembly upon the tank; and the mating T-irons 35 are rolled to a corresponding radius. The edge of the central web 25 is then welded as at 36 to the band 32 to form the ring sectors 28 and 30. These assembled sectors are then secured by welding the base flange 37 of the T-iron to the inner tank, either from the inside at the joint 27 between the panels or by welding the edges of the flange 37 to the outside of the tank or both. After the assembled ring sections are welded in place, the formed sheet metal panels constituting the outer shell may be joined as at 40 to the sheath 33 of the load bearing ring along the butt joints between the panels with the sheath providing a backing for the edges of the panels.

In the construction shown in Figure 5, it will be observed that the asbestos sheet 31 interrupts the continuity of the metal connection constituted by the assembled ring to prevent a direct metal heat leak through the ring, providing at the same time a rigid structure for supporting the load. In a trailer vehicle which carries the tank only at opposite ends with the tank spanning the running gear and fifth wheel, the load bearing rings which are located at the running gear and fifth wheel frames carry the load while those in between serve merely to space the outer shell from the inner shell. If desired, therefore, the spacing of the intermediate rings may be increased to eliminate a certain number of them and thereby to reduce the weight of the vehicle.

In the modified ring structure disclosed in Figure 6, the load bearing ring performs the same function as that disclosed in Figure 5 except that the insulating sheet 31 is installed upon the base flange 37 of the T-iron with the flat band 32 welded to the vertical flange of the T-iron. In this construction, the ring sectors are assembled in straight condition, the assembled T-iron and band being separately rolled to the proper curvature, then welded together in the same manner as above disclosed. After forming and welding, the sectors are applied with the band 32 welded to the inner shell; the outer shell is then applied by welding the panels to the sheath 33. This structure may further be modified by eliminating the T-iron and instead utilizing two flat bands 32 with the vertical web 25 welded as a separate part along the bands to constitute in assembly an I-shaped section having substantially the same strength as the structures illustrated in the drawings. This arrangement is shown in Figure 6 by the broken lines indicated at 41.

In the several ring structures disclosed, the clinched engagement of the metal sheath upon the insulating sheet interlocks the sheath securely with respect to the band 32. The sheath thus is completely protected from metal-to-metal contact and being under pressure engagement in all directions, prevents relative creep between the insulating sheet and its band or core. By preventing relative movement between the metal sections, the possibility of wear upon the insulating sheet under the shocks and vibrations incident to vehicle operation is checked and the insulating quality of the sheath is preserved almost indefinitely.

Having described our invention, we claim:

1. A heat insulated tank for the temporary storage of liquids comprising, an inner metal tank shell adapted to contain the stored liquid, a plurality of metal spacer members secured to the outer surface of the inner shell, an outer metal tank shell enclosing the inner shell, the outer shell being secured to the said spacer members and maintained thereby in spaced relationship with the inner shell, heat insulating material interposed between the spaced inner and outer shells adapted to provide a barrier to the interchange of heat between the spaced shells, the metallic spacer members each including a heat insulating section comprising, a transverse flange, a heat insulating sheet surrounding said flange, and a metal sheath enclosing the heat insulating sheet, the heat insulating section being interposed in the said metal spacer members to provide a barrier to the direct transfer of heat through the spacer members with respect to the spaced metal tank shells.

2. A heat insulated tank for the temporary storage of liquids comprising, an inner tank shell, a series of load bearing rings secured to and encircling the outer surface of the inner tank shell, the said load bearing rings having a metal web extending outwardly from the surface of the inner tank shell, a flange secured to the outer edge of the metal web, an outer tank shell enclosing the inner shell, the outer tank shell being maintained in spaced relationship with respect to the inner shell by the said webs, the spaced inner and outer shells being adapted to provide a barrier to the interchange of heat therebetween, a heat insulating sheet surrounding said flange, and a metallic sheath surrounding the heat insulating sheet and secured to the inner surface of the outer tank shell, the heat insulating sheet being adapted to provide a barrier to the direct transmission of heat through the web with respect to the spaced tank shells.

3. In an insulated tank adapted to be mounted upon the frame of a vehicle for the transportation of liquids, an inner tank shell, a series of load bearing rings encircling the inner tank shell, the said rings having metal webs and inner and outer flanges along opposite edges of the webs, an outer tank shell in spaced relationship with the inner shell, yieldable insulating material interposed between the spaced shells to provide a barrier to the interchange of heat between the shells, a flexible sheet formed of heat insulating material surrounding at least one of the flanges of the load bearing rings, and a metal sheath surrounding the flexible sheet and secured to the inner surface of the outer tank shell, the flexible sheet being adapted to present a barrier to the transfer of heat through the load bearing rings, the load bearing rings being arranged to space rigidly the inner tank with respect to the outer and being sustained by the vehicle to support the weight load of the inner tank shell without stressing the outer tank shell.

4. In an insulated tank for vehicles adapted to transport liquids, an inner tank shell, a series of load bearing rings encircling the inner shell, the said rings having metal webs and inner and outer flanges along opposite edges of the webs, the said inner flanges being secured upon the outer surface of the inner shell, an outer tank shell enclosing the inner shell, the outer shell being maintained by the load bearing rings in spaced relationship with respect to the inner shell, a heat insulating sheet surrounding the outer flange of the load bearing rings, a metal sheath enclosing the heat insulating sheet and providing a mechanical interlock upon the flange, and mounting means on the vehicle engaging the outer tank shell beneath said metal sheath adapted to support the inner tank with the heat insulating sheet presenting a barrier to the interchange of heat between the inner tank and the mounting means.

5. In an insulated tank adapted to be mounted upon the frame of a vehicle for the transportation of liquids, an insulated tank shell, a series of load bearing members for supporting the tank shell upon the vehicle frame, the said load bearing members having metal webs and marginal flanges secured in spaced relationship with respect to one another along the opposite edges of the metal webs, a flexible sheet formed of heat insulating material surrounding at least one of the said marginal flanges, a metal sheath clinched in pressure engagement with the heat insulating sheet and surrounding the same to provide a mechanical interlock upon the flange with the heat insulating sheet interposed between the flange and sheath to present a barrier to the transfer of heat, and mounting cradles secured upon the vehicle in alignment with the metal support webs of the load bearing members to support the insulated tank shell upon the vehicle frame.

6. In an insulated tank trailer for transporting liquids, an elongated inner tank shell adapted to contain the liquid in transit, a plurality of load bearing rings encircling the inner shell and secured thereto, an outer tank shell enclosing the inner shell, the outer shell being maintained in spaced relationship to the inner shell by the said load bearing rings, the load bearing rings each having a cross section adapted to reenforce the inner tank across its transverse axis, the configuration of the tank in cross section being adapted to render the same self-supporting along its longitudinal axis, respective trailer frames at the opposite ends of the tank having support means arranged to receive the weight load of the inner tank directly through the load bearing rings with the intermediate portion of the tank spanning the said frames in self-supporting position, and a heat insulating section comprising, a transverse flange, a heat insulating sheet surrounding said flange, and a metal sheath enclosing the heat insulating sheet, the heat insulating sheet being interposed in the load bearing rings to present a barrier to the transfer of heat between the trailer frames and inner shell through the load bearing rings.

7. In an insulated tank adapted to be mounted upon a vehicle frame and having an inner tank shell, a load bearing ring adapted to support the tank with respect to the vehicle frame comprising, a T-iron having a central web and a base flange adapted to be secured to the inner tank shell, a heat insulated flange constituting a metal core welded to the edge of the central web and spaced from the said base flange, a heat insulating sheet wrapped about the said metal core, and a metal sheath wrapped about the heat insulating sheet, the metal sheath being clinched in pressure engagement upon the insulating sheet to lock the sheath and insulating sheet upon the metal core against movement with respect to the core, the metal sheath being adapted to impose the weight load of the insulated tank upon the frame of a vehicle and to present a barrier to the transfer of heat between the vehicle frame and inner tank shell.

FRANK A. BEYER.
RALPH A. BRADLEY.
HARRY W. CRANK.

REFERENCES CITED

The following references are of record in the file of this patent:

UNITED STATES PATENTS

| Number | Name | Date |
| --- | --- | --- |
| 1,908,684 | Buchanan | May 16, 1933 |
| 2,000,882 | Comstock | May 7, 1935 |
| 2,088,101 | Widman et al. | July 27, 1937 |
| 2,117,397 | Bonsall | May 17, 1938 |
| 2,160,477 | Kramer | May 30, 1939 |
| 2,170,299 | Frank | Aug. 22, 1939 |
| 2,295,103 | Friedly | Sept. 8, 1942 |